Patented Apr. 22, 1947

2,419,272

UNITED STATES PATENT OFFICE 2,419,272

PROCESS OF FORMING A SILICA-CONTAINING HYDROGEL

Milton M. Marisic, Woodbury, and Arthur C. Schmitt, Wenonah, N. J., assignors to Socony-Vacuum Oil Company, Incorporated, a corporation of New York No Drawing. Application April 26, 1944, Serial No. 532,878

12 Claims. (Cl. 252—317)

1

This invention relates to a process for forming true gels comprising silica by neutralization of an acidified solution of alkyl silicates in alcohol.

It has been previously demonstrated that such gels may be formed if organic agents such as ethylene oxide and aniline are used to neutralize a solution of ethyl silicate in isopropyl alcohol. That process is described in U. S. Patent 2,317,803, which states that neutralization with "stronger alkaline-acting agents such as ammonia, ammonium carbonate, etc." results in precipitation of silica without true gel formation.

We have now found that if the alcoholic solution of alkyl silicate is acidified to a proper degree, subsequent neutralization with ammonia, if controlled as described hereinafter will result in formation of a true gel. The sol formed by neutralization may be injected to a body of water-immiscible liquid such as oil wherein it separates into globules which set to firm spheroidal particles of gel. This process for forming gel spheroids is described and claimed in U. S. 2,385,217 granted on September 18, 1945, to Milton M. Marisic.

This invention has for its object a method of preparing hydrocarbon conversion catalysts and the like from ethyl silicate and alcohol-soluble compounds of aluminum, zirconium, thorium, beryllium, titanium, boron, tin, etc., by acidifying alcoholic solutions of the aforementioned materials with dilute acids like nitric and hydrochloric to form a solution having a pH between 0 and 1, and then neutralizing the acidified solution with dilute aqueous ammonia to a pH between 4 and 9 and preferably between pH 5 and 8 to effect gelation in a relatively short time. We have found that acidification of the alcoholic solution of ethyl silicate (which may contain other desired salts) accelerated hydrolysis of the ethyl silicate and prevents precipitation on addition of ammonia. In some cases, sufficient alcohol-soluble salt such as aluminum nitrate may be added to the ethyl silicate solution to produce an acidity of below pH 1. When such is the case, further acidification with acid is not necessary.

The variables which affect the time of gelation are temperature, acidity and concentration of colloidal oxides. By control of these variables the gelation time can be adjusted to any desired value. At constant pH and fixed concentration of reactants, increasing the temperature decreases the time of gelation, while lowering temperature (below room temperature) increases gelation time. At constant pH and temperature, decreasing the concentration of the reactants by dilu-

2 tion with water or alcohol increases the time of gelation with increasing dilution. Increasing pH while the concentration of reactants and temperature are maintained constant, results in decreasing time of gelation. For commercial operations it is desirable to prepare gels containing the largest amount possible of insoluble oxides. From the foregoing description, it is apparent that the most concentrated gels are prepared at low temperatures, as for example 32° F., pH equal to 5 and at such concentrations of reactant solutions that a gelation time of a few seconds is obtained.

EXAMPLE I

Silica gel from ethyl silicate

Twenty-one hundred cc. of 4.071 normal nitric acid were added with constant stirring to an alcoholic solution of ethyl silicate, consisting of 1000 cc. of ethyl silicate and 1500 cc. of ethanol. The resulting solution had a pH of 0.4.

Eleven thousand cc. of one normal aqueous ammonia were then added to the above solution, with rapid stirring. The resulting hydrosol, having a pH of 7.8, set to a clear, firm, precipitate-free hydrogel in 30 seconds. This hydrogel contained 7.5% $SiO_2$ by weight. It was washed until substantially free of ammonium salts, by decantation with distilled water, and then slowly dehydrated to a clear, glassy gel, by gradually raising the temperature to 1050° F.

EXAMPLE II

Silica-alumina gel from ethyl ortho-silicate

One-hundred thirty-eight and five-tenths cc. of aluminum nitrate solution containing 0.052 gram of $Al_2O_3$ per cc. was added to a solution of 475 cc. of ethyl ortho-silicate in 712 cc. of absolute alcohol. This solution (of pH=0.4) was then cooled to 5° C., and to it was added slowly and with constant stirring 52.5 cc. of 28.5% aqueous ammonia diluted with 1235 cc. of distilled water, also previously chilled to 5° C. Upon addition of the ammonia, the temperature rose to 18° C., and the final pH was 7.1.

Under these conditions the hydrosol set to a clear, firm, precipitate-free gel in five minutes. It had a total oxide concentration of 5.5%, based on the weight of freshly-formed hydrogel, of which 95% is $SiO_2$ and 5% is $Al_2O_3$.

In view of the fact that no non-volatile electrolyte was present in gels formed by the above-described method, no water washing or ion exchange was necessary. The gel was dried slowly, the temperature being gradually raised to 1050° F., at which state it was maintained for five hours, previous to testing as a catalyst.

The cracking activity under standard conditions was 50%.

EXAMPLE III

*Silica-alumina bead catalyst from ethyl ortho-silicate*

An alkali-free silica-alumina hydrosol was prepared by mixing 292 cc. of aluminum nitrate solution containing 0.052 gram of $Al_2O_3$ per cc., with a solution of 100 cc. of ethyl ortho-silicate in 150 cc. of absolute alcohol, cooling the resulting solution (pH=0.4) to 5° C., and adding slowly and with constant stirring 10 cc. of concentrated 28.5% aqueous ammonia diluted with 467 cc. of distilled water.

The hydrosol thus prepared had a pH of 6.0 and a total oxide concentration of 4%, of which 95% is $SiO_2$ and 5% is $Al_2O_3$. Gelation time was 40 seconds at 90° C.

The hydrosol was extruded into a column of "Red Band" oil, (S. U. V. @ 210° F.=120 seconds) maintained at 90° C. The hydrosol formed spherical globules in the oil, which set to a gel before reaching the bottom of the oil layer. The hydrogel beads were removed from the bottom of the column in a current of water. They were dried slowly, the temperature being gradually raised to 1050° F. and held there for five hours previous to being tested as catalyst.

The cracking activity of this catalyst under standard conditions was 50%.

Cracking activity at standard conditions is defined as the volume per cent conversion of Oklahoma City gas oil having a boiling range of 471° F. to 708° F. to gasoline of 400° F. endpoint by contacting vapors of the said gas oil with the catalyst at 800° F. and a liquid space velocity of 1.5 for 10-minute periods between regenerations.

We claim:

1. The process of forming a silica-containing hydrogel which comprises acidifying an alcohol solution of an alkyl silicate to a pH between about 0 and 1, and thereafter neutralizing the acidified alcohol solution to a pH between about 5 and 8 by addition thereto of a dilute aqueous solution of ammonia.

2. The process of forming a hydrogel containing silica and a metal oxide which comprises forming an alcohol solution of alkyl silicate and a hydrolyzable salt of a metal, said metal having an insoluble hydroxide and said solution having a pH value of about 0 to 1, and thereafter neutralizing the acid alcohol solution to a pH between about 5 and 8 by addition thereto of a dilute aqueous solution of ammonia.

3. The process of forming a hydrogel containing silica and alumina which comprises forming an alcohol solution of an alkyl silicate and a hydrolyzable salt of aluminum, said solution having a pH value of about 0 to 1, and thereafter neutralizing the acid alcohol solution to a pH between about 5 and 8 by addition thereto of a dilute aqueous solution of ammonia.

4. The process of forming a silica-containing hydrogel which comprises acidifying an alcohol solution of an alkyl silicate to a pH between about 0 and 1, and thereafter neutralizing the acidified alcohol solution to a pH between about 4 and 9 by addition thereto of a dilute aqueous solution of ammonia.

5. The process of forming a hydrogel containing silica and a metal oxide which comprises forming an alcohol solution of alkyl silicate and a hydrolyzable salt of a metal, said metal having an insoluble hydroxide and said solution having a pH value of about 0 to 1, and thereafter neutralizing the acid alcohol solution to a pH between about 4 and 9 by addition thereto of a dilute aqueous solution of ammonia.

6. The process of forming a hydrogel containing silica and alumina which comprises forming an alcohol solution of an alkyl silicate and a hydrolyzable salt of aluminum, said solution having a pH value of about 0 to 1, and thereafter neutralizing the acid alcohol solution to a pH between about 4 and 9 by addition thereto of a dilute aqueous solution of ammonia.

7. The process of forming a silica-containing hydrogel which comprises acidifying an alcohol solution of an alkyl silicate to a pH between about 0 and 1, and thereafter neutralizing the acidified alcohol solution to a pH between about 5 and 8 by addition thereto of a dilute aqueous solution of ammonia, injecting the neutralized alcohol solution into a body of a water-immiscible liquid as a plurality of globules and retaining said globules in said liquid until they gel to firm hydrogel globules.

8. The process of forming a hydrogel containing silica and a metal oxide which comprises forming an alcohol solution of alkyl silicate and a hydrolyzable salt of a metal, said metal having an insoluble hydroxide and said solution having a pH value of about 0 to 1, and thereafter neutralizing the acid alcohol solution to a pH between about 5 and 8 by addition thereto of a dilute aqueous solution of ammonia, injecting the neutralized alcohol solution into a body of a water-immiscible liquid as a plurality of globules and retaining said globules in said liquid until they gel to firm hydrogel globules.

9. The process of forming a hydrogel containing silica and alumina which comprises forming an alcohol solution of an alkyl silicate and a hydrolyzable salt of aluminum, said solution having a pH value of about 0 to 1, and thereafter neutralizing the acid alcohol solution to a pH between about 5 and 8 by addition thereto of a dilute aqueous solution of ammonia, injecting the neutralized alcohol solution into a body of a water-immiscible liquid as a plurality of globules and retaining said globules in said liquid until they gel to firm hydrogel globules.

10. The process of forming a silica-containing hydrogel which comprises acidifying an alcohol solution of an alkyl silicate to a pH between about 0 and 1, and thereafter neutralizing the acidified alcohol solution to a pH between about 4 and 9 by addition thereto of a dilute aqueous solution of ammonia, injecting the neutralized alcohol solution into a body of a water-immiscible liquid as a plurality of globules and retaining said globules in said liquid until they gel to firm hydrogel globules.

11. The process of forming a hydrogel containing silica and a metal oxide which comprises forming an alcohol solution of alkyl silicate and a hydrolyzable salt of a metal, said metal having an insoluble hydroxide and said solution having a pH value of about 0 to 1, and thereafter neutralizing the acid alcohol solution to a pH between about 4 and 9 by addition thereto of a dilute aqueous solution of ammonia, injecting the neutralized alcohol solution into a body of a water-immiscible liquid as a plurality of globules and retaining said globules in said liquid until they gel to firm hydrogel globules.

12. The process of forming a hydrogel containing silica and alumina which comprises forming an alcohol solution of an alkyl silicate and a hydrolyzable salt of aluminum, said solution having a pH value of about 0 to 1, and thereafter neutralizing the acid alcohol solution to a pH between about 4 and 9 by addition thereto of a dilute aqueous solution of ammonia, injecting the neutralized alcohol solution into a body of a water-immiscible liquid as a plurality of globules and retaining said globules in said liquid until they gel to firm hydrogel globules.

MILTON M. MARISIC.
ARTHUR C. SCHMITT.

REFERENCES CITED

The following references are of record in the file of this patent:

UNITED STATES PATENTS

| Number | Name | Date |
| --- | --- | --- |
| 1,939,647 | Arnold et al. | Dec. 19, 1933 |
| Re. 21,690 | Bond, Jr. | Jan. 14, 1941 |
| 2,348,647 | Reeves et al. | May 9, 1944 |
| 2,046,209 | Ray | June 30, 1936 |
| 2,347,733 | Christensen | May 2, 1944 |
| 1,577,186 | Patrick | Mar. 16, 1926 |
| 2,029,786 | Myddleton | Feb. 4, 1936 |
| 2,281,810 | Stone et al. | May 5, 1942 |
| 2,337,944 | Stoewener et al. | Dec. 28, 1943 |
| 2,348,647 | Reeves | May 9, 1944 |